Jan. 2, 1945.  C. W. HANSELL  2,366,614
RESISTANCE HAVING LOW TEMPERATURE COEFFICIENTS
Filed Oct. 10, 1942
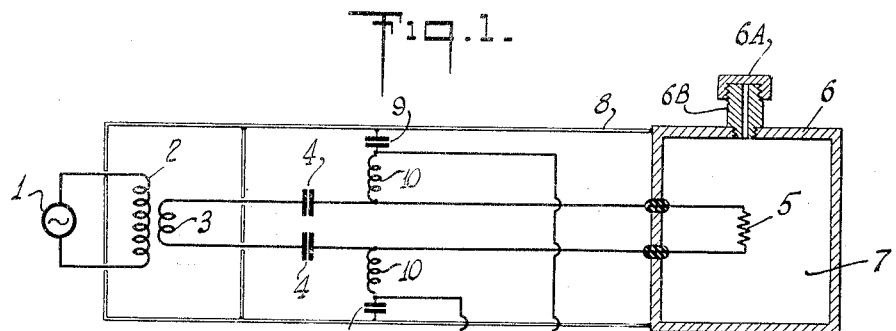
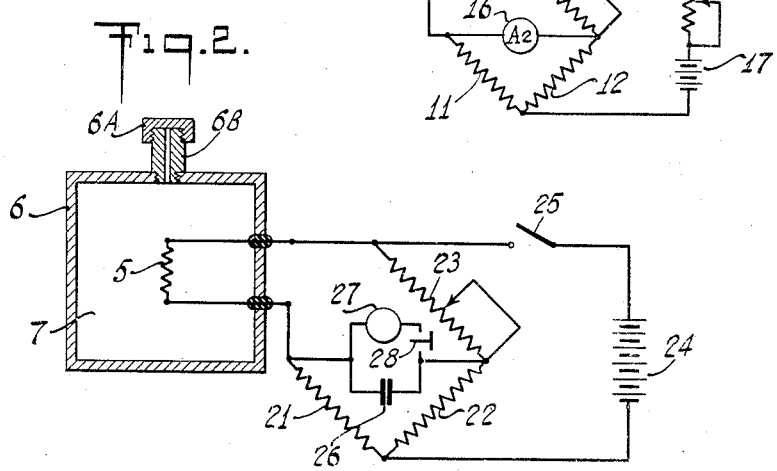
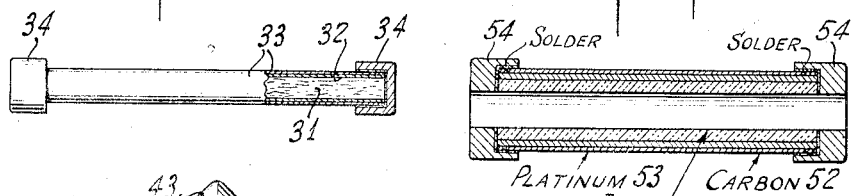
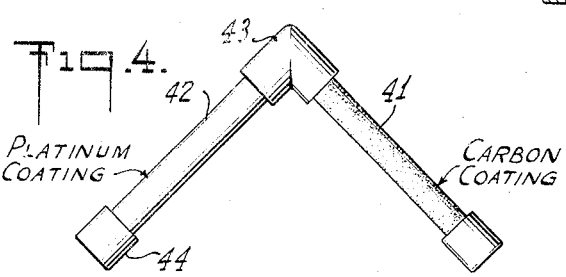
INVENTOR
Clarence W. Hansell.
BY H. S. Grover
ATTORNEY Patented Jan. 2, 1945

2,366,614

UNITED STATES PATENT OFFICE 2,366,614

RESISTANCE HAVING A LOW TEMPERATURE COEFFICIENT

Clarence W. Hansell, Port Jefferson, N. Y., assignor to Radio Corporation of America, a corporation of Delaware Application October 10, 1942, Serial No. 461,542

4 Claims. (Cl. 201—76)

This invention relates to a new and useful resistance having a low temperature coefficient, and is particularly adapted for use as a line terminating resistance for use in power measuring apparatus for frequencies in the order of 500 megacycles or more.

An object of this invention is to provide an improved resistance having a low temperature coefficient.

A feature of this invention is the coating of a relatively small support member with two layers of resistance material, each layer having a desired thickness in order to obtain a predetermined value of resistance. This application contains claims directed to a resistance element, whereas a divisional co-pending application Serial Number 531,911 filed April 20, 1944, contains the claims directed to a high frequency power measuring circuit.

Coated resistances are old in the prior art. However, such resistances are generally unsuitable for ultra-high frequency radio circuits because at these very high frequencies heating develops, and this causes a change in temperature, together with associated circuit losses. Also, because of the high temperature caused by the passage of the ultra-high frequencies through the resistance material, oxidation occurs, which destroys the value of the resistance in a relatively short period of operation. Therefore, it is a desirable characteristic of a resistance to have a low temperature coefficient, and by my invention I propose to overcome this difficulty by coating a support element, preferably an insulator, with two separate processed layers, one layer being of carbon and the other of platinum. I have found that an improved resistance can be obtained by first applying a layer of carbon, which will decrease resistivity with increasing temperature, and that metallic metal platinum increases resistivity with increasing temperature; thus, the two coatings compensate and cooperate to give an improved resistance element.

This invention will best be understood by referring to the accompanying drawing, in which Fig. 1 is a circuit diagram of a radio frequency power measuring system employing the resistance of this invention to measure the high frequency power by the substitution method.

Fig. 2 is a circuit diagram showing means for measuring high frequency power by the balance or bridge circuit method.

Fig. 3 is a detail of a simple form of the resistance device of this invention.

Fig. 4 is a modification of Fig. 3.

Fig. 5 is a sectional detail of a resistance element of this invention applied on a tubular support member.

Referring now in detail to Fig. 1 of the drawing, there is shown a means to measure high frequency power of an ultra high frequency radio circuit by the lamp load substitution method, in which there is a source of power 1, such as an oscillation generator which is connected to a transformer having a primary 2 and a secondary 3 connected by a short section of a transmission line terminated in a resistance 5, which is substituted for the normal load of a radio transmitter and coupled by condenser 4 to give the same transmitter load conditions as the normal load. The resistance 5 is insulatingly located within an enclosed space, suitably that of metallic container 6, filled with an inert, or oxygen hungry, gas 7. The chamber 6 is provided with an outer shield 8 which encloses the circuit between container 6 and secondary 3. A balanced filter arrangement comprising condenser 9 and conductive reactance 10 is connected between the leads connecting to the load resistance 5 and the shield 8. Leads are connected from each filter section to a resistance bridge including fixed resistances 11 and 12, a calibrated variable resistance 13, which is connected to a junction point of resistance 12, a volt-meter 14 is connected across the other side of variable resistance 13 and fixed resistance 11, an ammeter 15 is connected in series between the lead connecting the filter and volt-meter 14. Across two diagonals of the bridge arrangement there is provided an indicating device, such as a milliammeter 16 or a galvanometer. The opposite diagonal of the bridge has a source of direct current power voltage 17 to give control of direct current power to the load resistance 5, which is connected in series with a variable resistance 18.

In the arrangement shown by Fig. 2 there is shown a means of measuring balance of a bridge circuit including fixed resistances 21 and 22, a variable resistance 23. The resistance 5, which is located within the container 6 as mentioned above, is connected across the remaining arm of the bridge circuit, the bridge circuit is energized by a source of voltage, such as a battery 24, and the circuit there-between being broken by switch 25. Between the diagonals of resistances 21 and 22 there is connected a relatively large capacity condenser 26 and a meter 27, preferably that of the zero center scale type, the circuit of which is controlled by means of a double contact push button switch 28. This measuring scheme should be generally useful in all bridge type measuring apparatus up to very high frequency values. In the arrangement shown, the meter 27, which is to indicate balance, is normally not in the circuit, but has the large capacity condenser 26 in its place. If the meter is connected across the condenser as shown, then by depressing the push button switch 28 the meter will be deflected momentarily far more than the continuous or steady state deflection could be. Such an arrangement has the effect of greatly increasing the useful sensitivity of the meter.

Referring now to Fig. 3, a simple form of resistance 5 of this invention is shown in detail and comprises a support member in the form of a strip or loop of quartz fiber 31 to be coated with resistance material of a desired thickness in order to obtain a predetermined value of resistance, and as mentioned above, I propose that the resistance coating be made in two layers, one of carbon and one of platinum.

The carbon coating 32 is applied by dipping the quartz filament in a solution of colloidal graphite. One form of colloidal graphite in water is obtainable under the trade name of "Aquadag." The mixture may be diluted so that several dippings, with drying steps between the dips, are required to obtain the desired resistance. When properly done the application of the carbon in this manner provides a very thin, smooth, uniform and strongly adherent coating.

Another material, which is sold under the trade name "Oildag" is colloidal graphite in oil. "Oildag" may be used to build up carbon coatings if it is suitably diluted with gasoline or other vaporizable solvent, provided the filament is heated between dips, in an inert atmosphere to prevent oxidation, to vaporize and carbonize the oil.

In practice it is recommended that the carbon coating be applied first, followed by a platinum coating, which results in an intimate mixture of carbon and platinum, in which the platinum will act as a binder, and to some extent a protective coat, for the carbon.

The platinum coating may be applied by dipping the quartz fiber 31 in a solution of platinic chloride in natural oil of lavender, alcohol and a little burgundy pitch of suitably adjusted strength, followed by heating in an inert atmosphere to vaporize the solvents and to reduce the platinic chloride to platinum metal. Suitable similar platinizing solutions are available commercially. They are usually used for decoration of tableware; and, in industry, are used as a coating on porcelain to permit soldering together of porcelain and metal parts in air-tight electrical bushings. Ordinarily, the commercial solutions would result in the application of a layer of platinum too thick for the present purpose so it is necessary that the commercial solutions be diluted as required with a mixture of oil of lavender, alcohol and pitch to get the high resistance coating necessary.

The ends of the support member 31 are provided with metal end caps 34 arranged to be securely anchored to filamentary quartz in such a manner as to make contact with both the carbon layer 32 and the platinum layer 33.

The modification shown by Fig. 4 includes two support members 41 and 42, which are joined together by a V-shaped metallic member 43, the opposite ends being provided with end caps 44 constructed similar to that mentioned above in connection with end caps 34 of Fig. 3. In this modification the support member 41 has a coating of carbon which is obtained by one or more dippings in the manner mentioned above in connection with coating 32. The support member 42 is coated with one or more coatings of platinum in the same manner as mentioned above in connection with coating 33, the two rods being electrically connected together by the metallic member 43.

Fig. 5 shows a resistance element of this invention in which the support member 51 is in the form of an insulating member of ceramic material and has coated on the outer surface thereof a carbon coating 52 and platinum coating 53. The coating being processed in the same manner as that mentioned above in connection with Fig. 3. The ends of insulator 51 are provided with a metallic ferrule 54 which makes connection to both the carbon and platinum coating.

In the operation of this device, the high temperatures encountered might cause the metallic surfaces to oxidize, therefore, it is desirable to place the resistance element 5 within the casing 6, filling the casing with an inert gas such as hydrogen, by means of removing the filler cap 6A on casing valve 6B and inserting the inert gas or oxygen hungry atmosphere. It might be desirable to apply both high frequency and a direct current or low frequency power to the resistance 5 in order to hold a constant temperature for reading. Then the difference in direct current, or low frequency power, required to bring the filament to an arbitrary temperature, with the high frequency on or off, is a measure of the high frequency power. As an indication of temperature, the use of a metal coated quartz fiber, or a metal wire or tube would permit measuring the temperature by measuring the resistance. Since the metal has a large coefficient of resistance, the value of resistance is a good measure of temperature. Furthermore, by adjusting the direct current heating current the high frequency value of the resistance may be adjusted; then, by varying the temperature, a desired value of load resistance is obtained. By varying the potential applied to the resistance bridge circuit from the direct current source, the filament temperature may be adjusted over a considerable range to provide for matching the characteristic impedance of the transmission line, or to otherwise control the loading conditions.

If the transmitter power is turned on and off, and for both conditions the direct current power to the filament is adjusted to give the same filament resistance, then the difference in direct current power required for the two conditions is equal to the radio frequency power into the filament when the transmitter is turned on.

Although only a few modifications of this invention are shown, it is to be distinctly understood that the invention should not be limited precisely thereto.

I claim:

1. The method of making an ultra high frequency resistance including the steps of subjecting a support member to a solution of colloidal graphite in water by dipping it to coat said support member, drying the coating on said support member, and then applying thereto a solution of platinic chloride in natural oil of lavender, alcohol and a little burgundy pitch, followed by heating to reduce the chloride to platinum and to drive off vaporizable materials.

2. The method of making an ultra high frequency resistance including the steps of subjecting a support member to a solution of colloidal graphite in oil by dipping it to coat said support member, heating and drying the coating on said support member, and then applying thereto a solution of platinic chloride in natural oil of lavender, alcohol and a little burgundy pitch, followed by heating to a temperature high enough to reduce the chloride to platinum metal.

3. The method of making an ultra high frequency resistance including the steps of subjecting a support member successively to a solution of colloidal graphite in water by dipping it to coat said support member, each time drying the coating on said support member, and measuring the resistance of said coating to determine the proper coating and resistance value, and then applying thereto successive coatings of platinum and measuring said platinum coatings to determine the proper resistance value.

4. A high frequency resistance comprising a first support member having a layer of carbon, a V-shaped metallic member, a second support member having a layer of platinum, at least one end of said first support member and one end of said second support member secured to and electrically connected to said V-shaped metallic member, and means located at the opposite ends of each one of said support members for electrically connecting the coating of said first and second support members together in series.

CLARENCE W. HANSELL.